United States Patent [19]  [11] 3,939,294
Fieldhouse  [45] Feb. 17, 1976

[54] ADHESIVES AND THEIR USE

[75] Inventor: John William Fieldhouse, Akron, Ohio

[73] Assignee: The Firestone Tire & Rubber Company, Akron, Ohio

[22] Filed: Aug. 1, 1974

[21] Appl. No.: 493,796

[52] U.S. Cl.......... 428/424; 152/330 R; 156/110 A; 156/331; 260/77.5 R; 428/425; 428/500
[51] Int. Cl.$^2$ B32B 27/40; C08G 18/00; B29H 5/02
[58] Field of Search 161/190; 260/77.5 R, 77.5 AQ; 156/325, 331, 110 A; 428/423, 424, 425

[56] References Cited
UNITED STATES PATENTS

| | | | |
|---|---|---|---|
| 2,905,582 | 9/1959 | Coleman et al. | 161/190 X |
| 3,268,479 | 8/1966 | Mortel | 260/77.5 R X |
| 3,425,886 | 2/1969 | Heins | 161/190 X |
| 3,542,639 | 11/1970 | Manino | 161/190 X |
| 3,648,748 | 3/1972 | Lovell | 161/190 X |

Primary Examiner—George F. Lesmes
Assistant Examiner—Alan T. McDonald

[57] ABSTRACT

The adhesive properties of compositions which contain an organic isocyanate, with or without a film-former, are improved by the inclusion of (a) an aliphatic hydrocarbyl nitrite or (b) a nitrite ester of a carbamic acid which acts as an adhesive promoter. The compositions are useful for adhering natural and synthetic polymeric elastomers, and are particularly useful in the production of laminations formed from polyurethane polymers and other substrates including metals, etc. and especially the formation of laminations from the cured tread of a conventional rubber to a curable polyurethane prepolymer composition which can be formed in the shape of a tire body.

12 Claims, 1 Drawing Figure

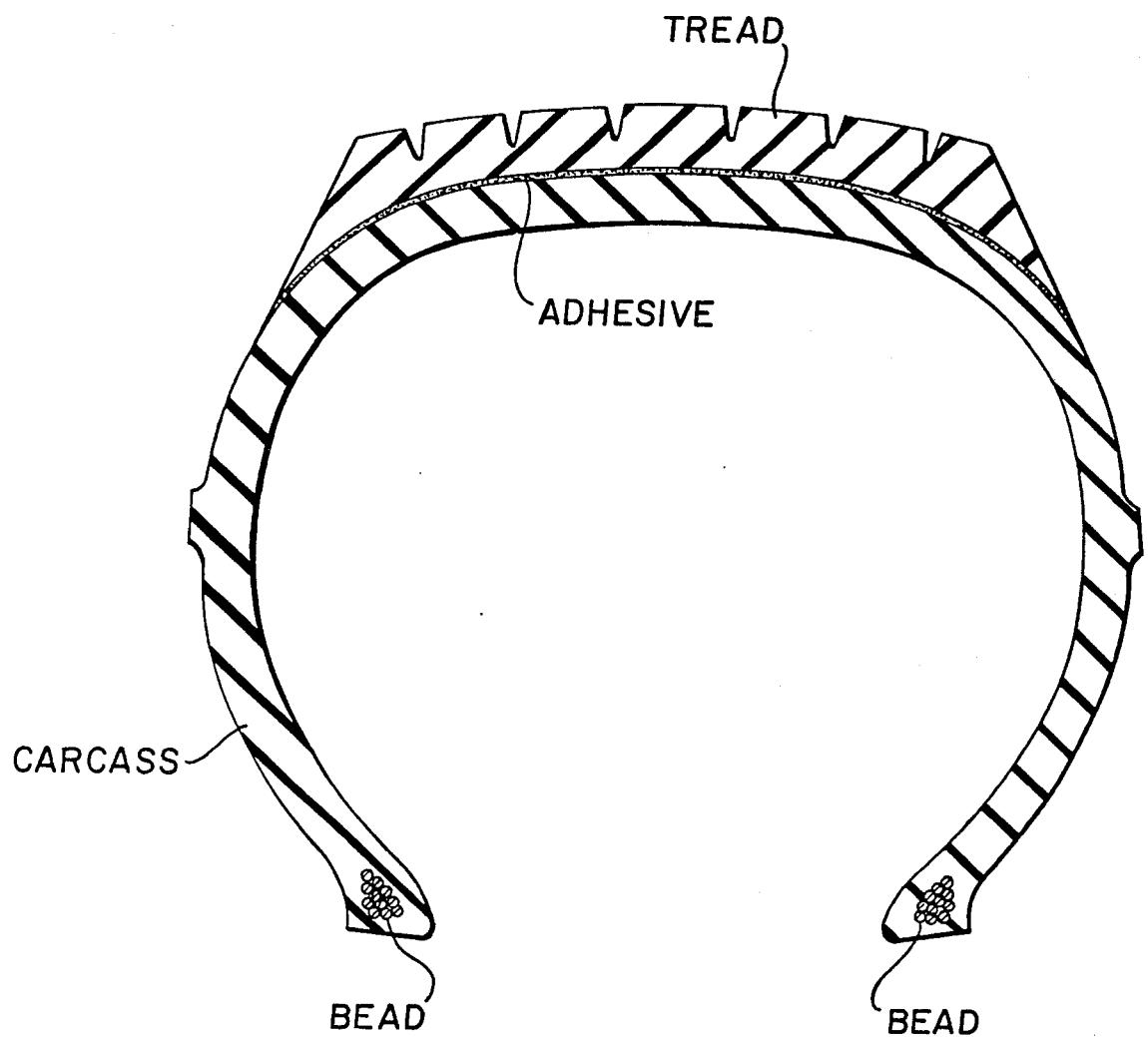

ADHESIVES AND THEIR USE

FIELD OF THE INVENTION

This invention relates to obtaining improved adhesion to polyurethane rubbers and olefinic rubbers and other substrates including metals, and pertains particularly to the adhesion of two substrates to one another in the production of tires and other laminations. By polyurethane rubbers are meant the rubbers produced by reaction of a polyisocyanate with a polymer such as a polyester or polyether or conjugated diene polymerized in such a manner as to have terminal functional groups. By olefinic rubbers are meant those rubbers containing olefinic unsaturation in their polymer chains such as natural rubber (NR), synthetic polyisoprene (IR), polybutadiene (BR), butadiene-isoprene copolymer (BI), rubbery copolymers of butadiene and styrene (SBR), rubbery copolymers of butadiene and acrylonitrile (NBR), rubbery copolymers of isoprene and isobutylene (IIR), polychloroprene (CR), ethylene-propylene rubbers (EPDM) and the like. This invention has particular use in applications where adhesive strength of a high degree is important as in the production of tires, belting, industrial rubber articles and like products composed of both polyurethane rubber and olefinic rubber components.

PRIOR ART

It is known from U.S. Pat. No. 2,905,583 that bonding of a polyurethane rubber to an olefinic rubber can be realized by interposing between such rubbers an adhesive including in combination an organic isocyanate and an aromatic compound containing at least one nitroso group attached directly to an aromatic ring carbon atom. The patent suggests that its adhesive compositions contain in addition to the described aromatic nitroso compounds and isocyanates, a so-called organic film-forming material such as a natural or synthetic elastomer or resin and it is further contemplated by the patent that tires be produced by adhering a polyurethane rubber tread to an olefinic rubber body.

It has nothing to do with the use of hydrocarbyl nitrites or nitrite esters of carbamic acids as adhesive promoters.

SUMMARY OF THE INVENTION

The adhesive properties of a film-forming material and an organic isocyanate are improved by first mixing with the film-forming material and organic isocyanate, and a solvent for these materials, an aliphatic hydrocarbyl nitrite or a nitrite ester of a carbamic acid.

Almost any polymeric material can be used as an organic film-former according to this invention. The primary function of the film-former, which may be a liquid or solid or a hot melt or a solid in solution in an organic solvent, is to modify the viscosity of the adhesive formulation so that it can be readily applied, as by brushing, troweling, spraying, etc. In effect, the film-former adds physical strength to the adhesion formulation so that the bonded substrates can be physically handled before final cure of the adhesive.

Olefinic elastomers such as natural rubber and synthetic rubber may be used as film-formers. The term "synthetic rubber" includes synthetic polyisoprene, polybutadiene, butadiene-styrene copolymers and block polymers, polyurethanes, butadiene-isoprene copolymers and block polymers, copolymers of isoprene-isobutene, polychloroprene, ethylene-propylene terpolymers and like piperylene homopolymers and copolymers and the like. The film-formers are not vulcanized. They may be solids or liquids of any practical molecular weight.

A polyurethane rubber may be based on a polyester or a polyether or a combination of the two. It may be based on a conjugated diene homopolymer or copolymer containing terminal functional groups. These elastomers and their prepolymers are also film-formers. Other film-formers include telechelic polymers and olefinic resins and the halogen-containing analogs of such materials and the foregoing natural and synthetic elastomers and condensation polymers including phenol-aldehyde and epoxy resins, polyamides, polyesters, etc. The film-former may be a halogenated wax.

Although toluene diisocyanate is generally used in the production of polyurethanes, other isocyanates suitable as a component of the adhesive formulations of this invention include phenylisocyanate, tolylisocyanate, xylene diisocyanate, cumene diisocyanate, methylenebis(p,p'-phenylisocyanate), methylenebis(p,p'-tolylisocyanate), methylenebis(p,p'-xylylisocyanate) and the like. Triisocyanates or higher will also function but are generally more expensive and less readily available on a commercial scale. Toluene diisocyanate is preferred on the basis of commerical availability. So-called blocked isocyanates which release the isocyanate at specified temperatures will also function provided that the release temperature is lower than the cure temperature of the composite. Representative blocked isocyanates that may be used include phenol-blocked or caprolactam-blocked isocyanates. Dimeric isocyanates are also applicable. Organic isothiocyanates such as phenylisothiocyanate are also applicable. Another criterion for selection of an isocyanate is whether it would have a tendency to discolor the substrate. For example, Hylene W* is essentially non-staining and would be preferred on this basis.

\* methylenebis(4,4'-cyclohexylisocyanate) supplied by E. I. duPont de Nemours & Co., Inc.

Although toluene is used above as a solvent as a matter of convenience, hexane, cyclohexane, tetrahydrofuran, benzene, xylenes, dimethylformamide or many other common organic solvents as well as toluene are suitable. Any aprotic solvent should be effective. In case the adhesion promoter is liquid, the solvent may be deleted.

The exact concentrations of the film-former, adhesion promoter and isocyanate will depend on the strength of the adhesive bond desired in the final product. Generally, concentrations are selected to obtain optimum adhesion desired for a specific application. In addition, the concentrations are also adjusted to obtain a correct viscosity; that is, if the formulation is to be sprayed, the viscosity should be low, if brushed or dipped an intermediate viscosity would be desired. If the adhesive is to be troweled onto the surface, a higher viscosity is desired. As a guide, suitable concentrations of film-former, adhesion promoter and isocyanate on a solvent-free basis normally fall within the following ranges:

| | Parts by Weight |
|---|---|
| Film-Former | 0–90 |
| Adhesion Promoter | 1–60 |
| Isocyanate | 1–95 |

HYDROCARBYL NITRITES AND NITRITE ESTERS OF CARBAMIC ACIDS

To more clearly define the scope of the invention, the following generalized formula is presented which describes typical compounds useful as adhesion promoters according to the invention:

   Generalized Formula in which $R_1$, $R_2$ and $R_3$ represent a saturated or unsaturated hydrocarbyl group of 2 to 16 carbon atoms or C, $R_1$, $R_2$ and $R_3$ represent a hydrocarbyl group which includes a cyclic-containing aliphatic hydrocarbyl group of 5 to 7 carbon atoms. The hydrocarbyl groups may be alkyl groups which contain one to sixteen or more carbon atoms. They may be saturated or unsaturated and may include halogen atoms selected from the class consisting of chlorine and bromine.

Hydrocarbyl nitrites are relatively easily prepared by the reaction of nitrous acid with a hydrocarbyl group containing a hydroxyl function. The reaction may be illustrated as follows:

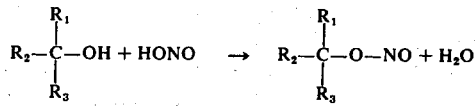

The hydrocarbyl groups shown in the Generalized Formula may be the same or different. The carbon atoms of an alkyl group may be arranged in a straight-chain configuration or branched, and be saturated or unsaturated. The carbon atoms may also be arranged in a cyclic configuration or any combination of the above described configurations. A plurality of nitrite functions may also be present, or nitrite esters of carbamic acids may be used such as those represented by the general formula:

   Generalized Formula in which R may be a hydrocarbyl group either aliphatic or aromatic containing a total of about 16 carbon atoms. If R is an aliphatic group, the carbon atoms may be arranged in a straight-chain configuration or branched, and may be saturated or unsaturated. The carbon atoms may be arranged in a cyclic configuration or any combination of the above described configurations. If R is aromatic, the aromatic nucleus may be substituted with alkyl groups, halogen atoms selected from chlorine or bromine. R may also represent a condensed aromatic ring such as a naphthyl group.

The symbol X may represent an isocyanate function (—NCO), a carbomate nitrite function (—NH-.COO.NO) or a urethane function (—NH.COO.R′) where R′ has the same meaning as R in the preceding general formula.

Illustrative straight-chain aliphatic hydrocarbyl nitrites are:
  ethyl nitrite,
  propyl nitrite,
  n-butyl nitrite,
  n-amyl nitrite,
  n-octyl nitrite,
  n-decyl nitrite and
  n-dodecyl nitrite
and branched-chain nitrites are:
  isopropyl nitrite,
  isobutyl nitrite,
  tertiary butyl nitrite,
  2-methylbutyl nitrite,
  2-ethylhexyl nitrite and
  2-ethyldecyl nitrite
and the like.

Typical unsaturated hydrocarbyl aliphatic nitrites are:
  allyl nitrite,
  methallyl nitrite,
  1,1-dimethyl-2-propenyl nitrite,
  1-methyl-1-ethyl-2-propenyl nitrite,
  2-hexadecenyl nitrite, etc.
and cyclic hydrocarbyl nitrites:
  cyclopentyl nitrite,
  cyclohexyl nitrite,
  2-methylcyclopentyl nitrite, and
  2-methylcyclohexyl nitrite
and the like.

Nitrite esters of glycol, glycerine and polyvinyl alcohol illustrate materials containing a plurality of nitrite functions which should be useful as adhesion promoters.

The nitrite function can also be incorporated into an organic molecule by reaction of an organic isocyanate with nitrous acid. The reaction may be illustrated as follows:

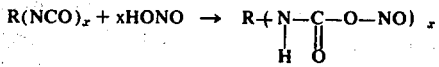

in which R is an aliphatic, cyclo-aliphatic or aromatic hydrocarbyl group of 1 to 16 carbon atoms and $x$ is 1 or 2.

For example, the reaction of toluene diisocyanate with nitrous acid would be expected to form a mono as well as a di-nitrite according to this series of equations:

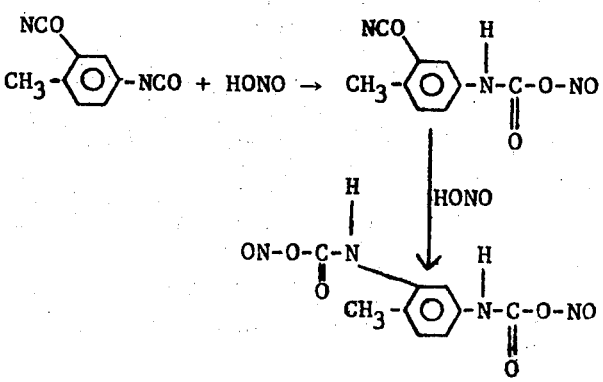

To illustrate the formulation of a mono-nitrite, 34.8 grams (0.20 mole) of toluene diisocyanate were dissolved in 250 moles of tetrahydrofuran and 13.8 grams of sodium nitrite (0.20 mole) were added. The mixture was saturated with gaseous hydrogen chloride and then the mixture was refluxed approximately 16 hours to give a red solution containing dispersed sodium chloride. The reaction mixture was filtered to remove the sodium chloride and the clear red filtrate was concentrated to about 50% active material by removal of tetrahydrofuran under vacuum.

The structure of the active material is believed to be:

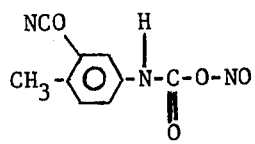

A small amount of a di-nitrite would be expected since both isocyanate functions can react with nitrous acid; however, due to the steric hindrance of the ortho methyl group, the isocyanate function ortho to the methyl is less reactive and the predominant product expected is as shown.

For the purpose of brevity, the compound is identified below as Adhesive Promoter C.

In another example, 31.5 grams of Adiprene L-167 (a reaction product of a diisocyanate and a polyalkylene ether glycol) marketed by duPont and containing 6.27% isocyanate function was dissolved in 200 mls of tetrahydrofuran to give a 0.05 molar isocyanate solution. Sodium nitrite (3.8 grams, 0.055 moles) was added and the reaction mixture was saturated with hydrogen chloride gas. The reaction mixture was stirred at ambient temperature for three days and then filtered to remove sodium chloride. The yellowish-red filtrate was heated under vacuum to concentrate the active nitrite compound to about 50% by removal of tetrahydrofuran solvent. The probable structure of the compound is as follows:

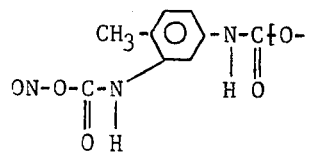

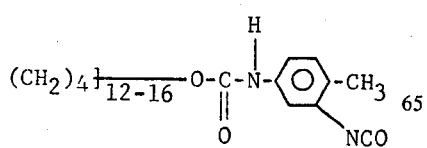

This product is identified below as Compound E.

The generic formula of such promoters is:

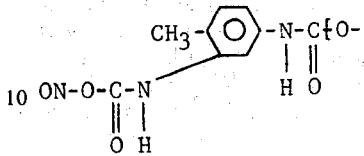

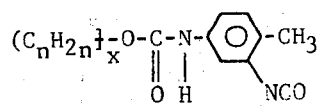

in which $n$ is 1 to 8 carbon atoms and the value of $x$ will depend upon the valve of n to give a polymer with a molecular weight range of 1,000 to 3,000.

Another example of an adhesion promoter containing a nitrite function was prepared by dissolving 34.8 grams (0.20 mole) of toluene diisocyanate in 300 mls of tetrahydrofuran and adding 18.8 grams of phenol (0.20 mole) to the solution at ambient temperature over a period of 15 minutes. After the addition of phenol, 13.8 grams (0.20 mole) of sodium nitrite was added and then 19.6 grams (0.20 mole) of concentrated sulfuric acid was added in a period of fifteen minutes. The reaction mixture turned a deep-red coloration indicating a reaction was taking place. The mixture was stirred for about seventeen hours at 40°C. The reaction mixture was evaluated as an adhesion promoter without additional purification. The most probable structure is as follows:

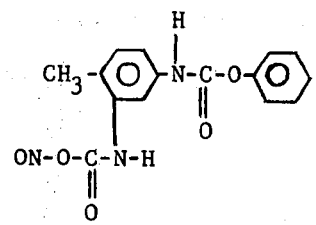

The product is identified as Adhesion Promoter D.

ADHESION TESTS

The adhesion test results reported hereafter were obtained on laminations of olefinic rubber and polyurethane rubber, a cement of the film-former (if used), an organic isocyanate and a promoter prepared in accordance with the invention having been interposed between the two rubbers. The procedure was as follows:

First, a sheet 6 inches square and 0.100 inch thick was prepared from vulcanizable olefinic rubber compound. One side of the olefinic rubber sheet was backed with reinforcing nylon tire fabric treated for adhesion. This sheet was cured (usually on the order of 20 to 30 minutes at about 300° F.). The cured olefinic rubber sheet was buffed to a satiny finish on the side opposite the tire fabric, the buffed surface being then washed with acetone or white gasoline. A two by six inch portion of the buffed surface was covered with holland cloth, the holland cloth being securely taped down on all four edges to prevent adhesion and facilitate subsequent testing in an Instron tester. The exposed buffed surface of the cured olefinic rubber sheet was coated with the adhesive cement of the invention being tested and allowed to dry. The olefinic rubber sheet was then placed in the bottom of a 6 by 6 by 0.250 inch mold with the adhesive-cement-coated surface up. A curable liquid polyurethane rubber compound was poured into the mold in a suufficient quantity to fill the mold. After the polyurethane material had gelled a 6 by 6 inch piece of square woven nylon was prepared on the surface of the polyurethane to prevent direct contact with the hot mold during subsequent complete curing. A cover plate was placed on the top of the mold and the mold was heated 3 hours at 212° F. to complete the curing of the polyurethane rubber. Flashing was trimmed from the resulting test lamination and the edge containing the holland cloth was cut back to expose the cloth to initiate separation of the two substrates. One inch wide test strips were cut from the lamination in a direction parallel to the direction of the reinforcing tire cord. After 24 hours at room temperature, test results were obtained by clamping the free ends of a given test strip of the jaws of a testing machine and the jaws of the test machine were pulled apart at a rate of 2 inches per minute, the force in pounds per inch at tear as well as the nature of the tear being observed. With regard to the nature of the adhesion, the terms "Pad Tear", "Rubber Tear" and "Adhesive", as they may appear hereafter have the following meanings. Pad Tear means that the tear was along the nylon fabric. Rubber Tear means that the tear was in the olefinic rubber. Adhesive means that the tear was at the interface between the adhesive and one of the substrates. Where the percentage of tear reported hereafter is less than 100%, the balance was tear along the adhesive interface. For elevated temperature testing as reported in the table, the test samples were placed in an oven maintained at the desired elevated temperature. Each test sample was then removed after being in the oven a total of 15 minutes and immediately subjected to the pulling test.

The following examples illustrate practice of the invention. In the examples the vulcanizable olefinic rubber sheets employed were prepared of the following formulation:

|  | Parts by Weight |
|---|---|
| SBR | 60.0 |
| Polybutadiene | 40.0 |
| Carbon Black | 70.0 |
| Oil | 44.0 |
| Zinc Oxide | 2.0 |
| Stearic Acid | 2.0 |
| Wax | 3.0 |
| Sulfur | 1.7 |
| Accelerator | 1.2 |
| Antioxidant | 1.0 |

Following the procedure above outlined, such sheets were backed with nylon fabric as previously described, cured, buffed and one surface coated by brushing with a cement containing the adhesion promoter of the invention. The adhesive coated sheets were in each instance formed into a lamination by the abovedescribed procedure with a polyurethane rubber composition of the following formulation:

|  | Parts by Weight |
|---|---|
| Adiprene L-167* | 100.00 |
| Silicone DC-200** | 0.10 |
| Methylene bis-(o-chloro-p-aniline) | 20.98 |
| Dioctyl phthalate | 20.00 |

*A reaction product of a diisocyanate and a polyalkylene ether glycol, supplied by E. I. duPont deNemours & Co., Inc.
**A silicone oil supplied by Dow Corning Corporation.

Table I

EVALUATION OF EXPERIMENTAL ADHESIVE FORMULATIONS
Weight % Composition

|  | Control | Experiment No. 1 | 2 | 3 | 4 | 5 |
|---|---|---|---|---|---|---|
| Adiprene L-167 | — | 36 | — | — | — | — |
| Adiprene LD-784 | — | — | 19 | 20 | 22 | — |
| Toluene Diisocyanate | * | 18 | 19 | 20 | 22 | 20 |
| Toluene | — | 36 | — | — | — | — |
| Acetone | — | — | 52 | 40 | — | 40 |
| Adhesive Promoter A | — | 10 | — | — | — | — |
| B | — | — | 10 | — | — | — |
| C | — | — | — | 20 | — | — |
| D | — | — | — | — | 56 | — |
| Compound E | — | — | — | — | — | 40 |
| Adhesive Strength, Lbs./Inch At: |  |  |  |  |  |  |
| 72°F. | ** | 76 | 95 | 90 | 33 | 8.5 |
| 212°F. | ** | 64 | 17 | 14 | 14 | 1.0 |
| 250°F. | ** | 53 | 21 | 23 | 16 | 1.0 |
| 300°F. | ** | — | 17 | 8 | 15 | 0.5 |
| Nature of Adhesive at: |  |  |  |  |  |  |
| 72°F. | ** | 100% Rubber & Pad | 100% Rubber & Pad | 90% Pad | *** | 100% Adhesive |
| 212°F. | ** | " | 100% Pad | 100% Pad | *** | " |
| 250°F. | ** | " | 100% Pad | 100% Pad | *** | " |

Table I-continued

EVALUATION OF EXPERIMENTAL ADHESIVE FORMULATIONS
Weight % Composition

| | Control | Experiment No. 1 | 2 | 3 | 4 | 5 |
|---|---|---|---|---|---|---|
| 300°F. | ** | — | 75% Pad | 100% Pad | *** | '' |

\* - Brushed on to substrate.
\*\* - Too weak to test.
\*\*\* - Foam formed at interface and failure occurred.

FOOTNOTES OF TABLE I

Adiprene L-167 is a polyurethane rubber supplied by E. I. duPont de Nemours & Co., Inc., and functions as a filmformer.
Adhesive Promoter A is isoamyl nitrite.
Adhesive Promoter B is cyclohexyl nitrite.
Adhesive Promoter C is the mono-nitrite ester formed by the reactions of mole of nitrous acid with toluene diisocyanate.
Adhesive Promoter D is the nitrite ester of phenol-blocked toluene diisocyanate.
Compound E is the reaction product of Adiprene L-167 with nitrous acid. Although the product contains both an isocyanate function and a nitrite function, it will be seen that it is not an adhesive promoter.

To demonstrate the utility of the adhesive promoters of the invention, the promoters were formulated with a film-former, toluene diisocyanate and toluene. The exact compositions of these formulations are summarized in Table I.

Following the previously described procedure, adhesion test strips were prepared using the adhesive formulations shown in Table I.

As indicated by the data recorded under Experiment Nos. 1 and 2 of Table I, both Adhesion Promoters A and B (isoamyl nitrite and cyclohexyl nitrite, respectively) effected good adhesive bonds between the vulcanized olefinic rubber and cured polyurethane. As expected, the bond strengths were reduced at the higher rupture temperatures; however, the bond strengths measured at 212° F. and 250° F. are considered good and indicate that laminates prepared in the manner described would have industrial applications at moderate temperatures.

The surface of the ruptured lamination as recorded in Table I under the column labeled "Nature of Adhesion At:" is of practical importance. It should be noted that the laminations prepared with isoamyl nitrite (Experiment No. 1) and cyclohexyl nitrite (Experiment No. 2) ruptured either in the rubber or pad. This means that if the tear resistance of the vulcanized olefinic rubber could be improved, higher adhesive bond strengths could be realized. That is, the lamination failed at their weakest points which were the rubber and pad.

Results obtained with Adhesive Promoter C under Experiment No. 3 are considered good and indicate that nitrite esters derived from the reaction of organic isocyanates and nitrous acid are good adhesion promoters. It should be pointed out that the 14 lbs./inch bond strength value obtained at 212° F. is lower than the 23 lbs./inch value obtained at 250° The lower value may be due to improper cleaning of the surfaces of the pad prior to application of the adhesive formulation. An alternative explanation is that the 23 lbs./inch value obtained at 250° F. was realized as a result of additional curing while heating the test laminate to 250° F.

In either event, the bond strengths obtainable with Adhesive Promoter C formulations are sufficiently high to demonstrate commercial utility.

The data on Adhesive Promoter D (Experiment No. 4) also demonstrate that this class of promoters have commercial utility. It should be pointed out that the adhesive layer foamed during the fabrication of the laminate. The foaming may have been due to adventious water on the surfaces of the pads. However, here again the bond strengths are considered adequate for many commercial applications, such as laminations which are not subjected to severe stress for example, decorative polyurethane with rubber, the rubber providing a shock absorbing phase but not between the tread and body of a tire.

Results obtained on the adhesive formulations containing Promoter E (Experiment No. 5) are not considered good and demonstrate the need of good adhesion promoters to obtain high bond strengths in the laminations tested.

As shown by the results reported in the above examples, good adhesion is obtained by the use of cements containing the adhesion promoters of the invention. Such cements without the adhesion promoters of the invention do not form bonds such as are generally required for the adhesion of a tread to a carcass in a pneumatic tire.

A particularly desirable application of the adhesive of the invention involves the adhesion of olefinic rubber tire treads to polyurethane rubber tire bodies. This is illustrated in FIG. 1.

For instance, the adhesive composition in such instances may be applied to the cured substrates or one or both of the substrates may be curable. If one substrate, for example the polyurethane carcass, or both substrates, are curable, the adhesive composition and the uncured substrate or substrates will be cured simultaneously. The curable adhesive is applied between the substrates and then the tire will be heated to cure the adhesive, and one or both substrates may be cured simultaneously with it. The adhesive may be cured by heating for 3 hours at 212° F. as disclosed above, and may be cured at this temperature with a curable polyurethane carcass. If it is cured with the olefinic rubber composition, it may be cured for 20–30 minutes at about 300° F. as disclosed above. Any cure conditions consistent with what is known in the art may be employed. The adhesive composition may be cast or brushed or otherwise applied to one or both substrates, which may be either cured or partially or completely precured. For instance, it may be cast on to the tread and this coated tread may then be wrapped around the cured or curable carcass which may be composed of polyurethane rubber and the assembly will then be heated to cure the adhesive and complete the curing of one or both of the substrates which had not been previously completely cured. Alternatively, the adhesive may be applied to the carcass and then the tread will be applied to it.

A further application of the invention involves treatment of rubber articles with the adhesive formulations of the invention as a means of priming the surface for painting with a urethane based paint or with an acrylate based paint.

In the claims, the word "tire" is to be construed generally as meaning an ordinary pneumatic tire, although the tire may be solid tire, such as a foam-filled tire or a solid rubber tire. Furthermore, it may be a self-supporting structure of the general shape of a pneumatic tire which does not require inflation by super-atmospheric pressure.

I claim:

1. A lamination of two rubber substrates adhered by a cured adhesive composition which comprises an organic isocyanate and an adhesive promoter having the formula

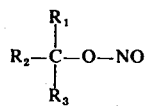

or

in which $R_1$, $R_2$ and $R_3$ represent a saturated or unsaturated hydrocarbyl group of 2 to 16 carbon atoms or C, $R_1$, $R_2$ and $R_3$ represent a hydrocarbyl group which includes a cyclic-containing aliphatic hydrocarbyl group of 5 to 7 carbon atoms, R is an aliphatic, cycloaliphatic or aromatic hydrocarbyl group of 1 t0 16 carbon atoms, X is hydrogen or —NCO or —NH.COO.NO or —NH.COO.$C_6H_5$ and $x$ is 1 or 2.

2. The lamination of claim 1 in which one of the substrates includes polyurethane rubber.

3. The lamination of claim 1 in which the adhesive composition includes a viscosity-reducing polymeric film-former and the promoter is isoamyl nitrite.

4. The lamination of claim 1 in which the adhesive composition includes a viscosity-reducing polymeric film-former and the promoter is cyclohexyl nitrite.

5. The lamination of claim 3 in which the substrates are an olefinic rubber and a polyurethane rubber.

6. The lamination of claim 4 in which the substrates are an olefinic rubber and a polyurethane rubber.

7. The lamination of claim 5 in which the promoter is isoamyl nitrite.

8. The lamination of claim 5 in which the promoter is cyclohexyl nitrite.

9. The lamination of claim 3 in which the substrates are a pneumatic tire tread and carcass.

10. The lamination of claim 4 in which one substrate is an olefinic tire tread and the other substrate is a curable polyurethane carcass.

11. The lamination of claim 10 in which the promoter is isoamyl nitrite.

12. The lamination of claim 10 in which the promoter is cyclohexyl nitrite.

* * * * *